Sept. 12, 1961  L. A. RINGELSTETTER  2,999,696
KICK-STAND AND PARKING BRAKE FOR BICYCLES AND SIMILAR VEHICLES
Filed Aug. 5, 1959

INVENTOR
LEO A. RINGELSTETTER
BY
*Joseph G. Werner*
ATTORNEY

United States Patent Office 2,999,696
Patented Sept. 12, 1961

2,999,696
KICK-STAND AND PARKING BRAKE FOR BICYCLES AND SIMILAR VEHICLES
Leo A. Ringelstetter, Plain, Wis.
Filed Aug. 5, 1959, Ser. No. 831,886
6 Claims. (Cl. 280—296)

This invention relates to a combined stand and parking brake for bicycles and similar vehicles.

An object of my invention is to provide a brake which is in direct contact with the rear tire of a bicycle, and prevents rolling of the bicycle on a grade when in parked position.

A further object of my invention is to provide such a brake which becomes actuated simultaneously with the lowering of the stand on the bicycle.

An additional object of my invention to to provide such a brake which may be released simultaneously with the raising of the stand.

Another object of my invention is to provide a combination of a brake and a kick-stand for a bicycle or similar vehicle wherein the brake may be retained locked in contact with the rear wheel when the stand is either in lowered or raised position.

A still further object of my invention is to provide a combination brake and stand for a bicycle or similar vehicle which is easily attached, easily operated and easily adjusted to a bicycle or similar vehicle of practically any size.

Other objects and advantages of the invention will be apparent from the following detailed description taken in conjunction with the accompanying drawings wherein a preferred embodiment of the principles of the invention has been selected for exemplification.

Figure 1:
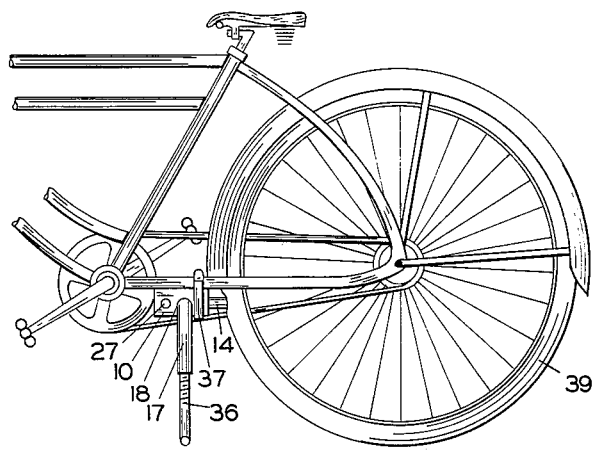
FIG. 1 shows an elevational view of my invention attached to a bicycle with the stand in downward position and the brake rod in direct contact with the rear tire.

Rigid casing 10 has a solid front plate 11 and a rear plate 12 with an aperture 13 through which the brake rod 14 of brake element 15 extends. The upper arm 16 of kick-stand or stand 17 extends through side apertures 18 and 19 of casing 10, so as to turn therein on its axis. U-shaped member 20 having sides 21, 22 and 23, is secured to the forward end of brake rod 14. Side 22 of U-shaped member 20 has an open slot 24 which is terminated at the rear by upwardly extending member 25. Spiral spring 26 extends between rear plate 12 of casing 10 and side 23 of U-shaped member 20, and is shown in extended position in FIG. 3, and in contracted position in FIG. 4.

Lock 27 is mounted through aperture 28 in casing 10 by mounting nut 29, and is locked and unlocked by key 38. Locking member 30 with extension 35 is pivotally and eccentrically secured to lock 27 by screw 31 or other appropriate means. Cam 32 is firmly secured by screw 33 or other means to upper arm 16 of stand 17. The forward surface 34 of side 23 of member 20 forms a cam seat for cam 32 when the latter is in the position shown in FIG. 4.

The lower arm 36 of stand 17 may be threadedly or otherwise adjustably engaged in stand 17 to permit any desired adjustment in the length of the kick stand to best cooperate with the brake device depending upon the size of the bicycle and the terrain of the land where the bicycle is parked. The device may be easily secured to the bicycle by adjustable clamping band 37 as shown in FIG. 1, or by other appropriate means, with sufficient proximity to tire 39 that brake rod 14 will be in contact with the tire when in the engaged position of FIG. 1. For smooth and efficient operation, casing 10 may be filled with grease to provide proper lubrication, care being taken to prevent leakage of grease through any of the openings.

Figure 3:
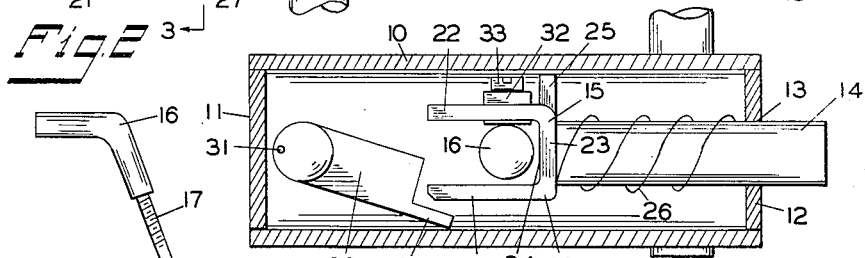
FIG. 3 is a partially sectional side view taken at the lines 3—3 of FIG. 2 showing the brake in unlocked released position.
Figure 6:
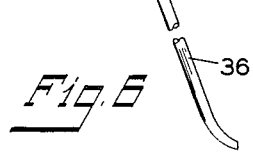
FIG. 6 is an elevational view of the adjustable bicycle stand.

In operation the device is secured to the bicycle as shown in FIG. 1. When it is in the released position shown in FIG. 3, the kick stand is in an "up" position. When the kick stand is up, cam 32 is at the top of upper arm 16, locking member 30 is in forward position, brake rod 14 of brake element 15 is in a forward position, all as shown in FIG. 3, and it is not in contact with tire 39.

Figure 4:
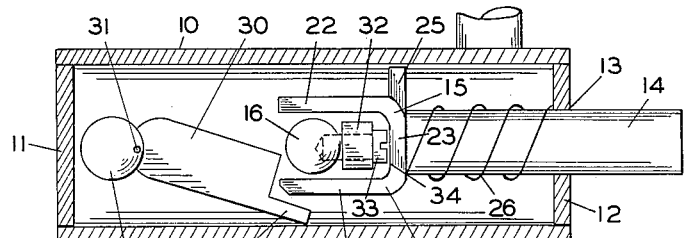
FIG. 4 is a view similar to that of FIG. 3 showing the brake in engaged locked position.
Figure 2:
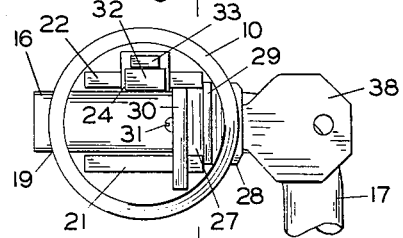
FIG. 2 is a front end elevation view with the front plate removed.
Figure 5:
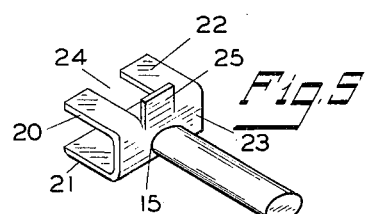
FIG. 5 is a perspective view of the brake element.

When the kick stand is lowered upper arm 16 turns, carrying with it cam 32 which strikes against extending member 25 and comes to rest against cam seat 34, as shown in FIG. 4. As cam 32 pushes against extending member 25 and cam seat 34, brake rod 14 is forced rearwardly so that the end thereof comes in direct contact with tire 39 causing positive brakage of the bicycle wheel as illustrated in FIG. 1. Upon raising the kick stand cam 32 is returned to the position of FIG. 3 and spring 26 forces brake rod 14 forward, as seen in FIG. 3, out of contact with tire 39.

In order to lock the brake rod 14 in braked position to prevent anyone from wheeling the bicycle away, it is necessary only to turn the key a one-half turn to the right and remove the key. When the key is so turned, locking member 30 comes in contact with side 21 of U-shaped member 20, as illustrated in FIG. 4 and retains brake rod 14 in contact with tire 39 even though the kick stand is raised. By turning the key to the left one-half turn locking member 30 is moved forward and returned to the unlocked position shown in FIG. 3.

It will be noted that the brake automatically becomes actuated when the stand is lowered, and that the brake is automatically released upon raising the stand, unless the brake is locked in position. The entire operation of lowering and raising the stand and of locking the brake is simple, merely requiring the foot to lower or raise the kick stand, and one hand to turn the key in the lock.

It is to be understood that the present invention is not confined to the particular construction and arrangement of parts herein illustrated and described, but embraces all such modifications thereof as may come within the scope of the following claims.

I claim:

1. A combination rear tire brake and kick-stand having a forward and rearward movement for bicycles and similar vehicles comprising, a casing having sides, a closed forward end and an apertured rearward end, an angular kick-stand having a substantially horizontal upper arm extending through opposed sides of the casing and swivelly secured thereto, a brake rod substantially parallel with the longitudinal axis of the casing having one end thereof slidably extended through the aperture of said rearward end of the casing, the other end carrying a U-shaped member in communication with the upper arm of the kickstand within said casing, said U-shaped member having its legs extending forwardly and having a cam seat in the bight portion thereof and a slot in the upper leg, a cam secured to the upper arm of the kick-stand communicable with the said slot and normally in pressure engagement against the cam seat to place said brake rod in extended position, spring means between the cam seat and the rearward end of the casing to urge said brake rod to a retracted position when the cam is in communication with said slot, means for securing said casing to the frame of the vehicle.

2. The invention of claim 1 additionally including locking means within the casing for retaining the brake rod in extended position.

3. The invention of claim 2 wherein the locking means comprises a lock mounted in a side of the casing, a locking member secured to said lock for engagement with said U-shaped member when said brake rod is extended.

4. The invention of claim 1 additionally including locking means within the casing for retaining said brake rod in contact with the rear tire of the vehicle when the cam is in communication with said slot.

5. A kick-stand and brake device in combination with rear wheel and frame of a bicycle comprising, a horizontally disposed casing having an apertured rearward end, a kick-stand having a substantially horizontal upper arm extending through said casing and swivelly secured thereto, a brake rod substantially parallel with the longitudinal axis of the casing having one end thereof slidably extended through the aperture of said rearward end of the casing and in contact with the rear wheel when in extended position, the other end of said brake rod carrying a U-shaped member in communication with the upper arm of the kick-stand within said casing, said U-shaped member having legs extending forwardly and having a cam seat in the bight portion thereof and a slot in the upper leg, a cam secured to the upper arm of the kick-stand communicable with said slot and normally in pressure engagement against the cam seat to place said brake in extended position, spring means between the cam seat and the rearward end of the casing to urge said brake rod to a retracted position when the cam is in communication with said slot, means for securing the casing to the frame of the bicycle.

6. A kick-stand and brake device in combination with the rear wheel and frame of a bicycle comprising, a horizontally disposed casing having an apertured rearward end, a kick-stand having a substantially horizontal upper arm extending through said casing and swivelly secured thereto, a brake rod substantially parallel with the longitudinal axis of the casing having one end thereof slidably extended through the aperture of said rearward end of the casing and in contact with the rear wheel when in extended position, the other end of said brake rod carrying a U-shaped member in communication with the upper arm of the kick-stand within said casing, said U-shaped member having its legs extending forwardly and having a cam seat in the bight portion thereof and a slot in the upper leg, a cam secured to the upper arm of the kick-stand communicable with said slot and normally in pressure engagement against the cam seat to place said brake in extended position, spring means between the cam seat and the rearward end of the casing to urge said brake rod to a retracted position when the cam is in communication with said slot, a lock mounted in said casing, a locking member secured to said lock for engagement with said cam rest when the brake rod is extended to retain it in extended position, means for securing the casing to the frame of the bicycle.

References Cited in the file of this patent
UNITED STATES PATENTS

| | | |
|---|---|---|
| 567,015 | Wells | Sept. 1, 1896 |
| 1,446,610 | Bell | Feb. 27, 1923 |
| 2,684,734 | Wilson | July 27, 1954 |